United States Patent
Tanaka et al.

(10) Patent No.: US 11,442,176 B2
(45) Date of Patent: Sep. 13, 2022

(54) INERTIAL SENSOR CALIBRATION BASED ON POWER BUDGET

(71) Applicant: SONY CORPORATION, Tokyo (JP)

(72) Inventors: Katsuyuki Tanaka, Tokyo (JP);
Mohamed Youssef, Kanagawa (JP);
Hidetoshi Kawauchi, Kanagawa (JP);
Katsumi Takaoka, Kanagawa (JP);
Kazukuni Takanohashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 558 days.

(21) Appl. No.: 16/260,266

(22) Filed: Jan. 29, 2019

(65) Prior Publication Data
US 2019/0235088 A1    Aug. 1, 2019

Related U.S. Application Data

(60) Provisional application No. 62/624,202, filed on Jan. 31, 2018.

(51) Int. Cl.
*G01S 19/34* (2010.01)
*G01C 21/16* (2006.01)
*G01C 25/00* (2006.01)
*G01S 19/47* (2010.01)

(52) U.S. Cl.
CPC ............ *G01S 19/34* (2013.01); *G01C 21/165* (2013.01); *G01C 25/005* (2013.01); *G01S 19/47* (2013.01)

(58) Field of Classification Search
CPC ............... G01S 19/32–33; G01S 19/34; G01S 19/421–426; G01S 19/49; G01S 19/246
See application file for complete search history.

(56) References Cited

U.S. PATENT DOCUMENTS

| | | | |
|---|---|---|---|
| 5,678,169 A * | 10/1997 | Turney | G01S 19/32 342/357.59 |
| 9,217,757 B2 | 12/2015 | Hergesheimer et al. | |
| 9,528,834 B2 | 12/2016 | Breed et al. | |
| 9,816,818 B2 | 11/2017 | Czompo et al. | |
| 2002/0177476 A1* | 11/2002 | Chou | G01S 19/49 455/574 |

(Continued)

OTHER PUBLICATIONS

R.D. Fontana et al., The New L2 Civil Signal, Proceedings of the 14th International Technical Meeting of the Satellite Division of The Institute of Navigation (ION GPS 2001), p. 617-631, 2001 (Year: 2001).*

(Continued)

*Primary Examiner* — Bernarr E Gregory
*Assistant Examiner* — Fred H Mull
(74) *Attorney, Agent, or Firm* — Chip Law Group

(57) ABSTRACT

A Global Navigation Satellite System (GNSS) enabled device includes an inertial sensor and receiver circuitry to track a position of the GNSS enabled device. The receiver circuitry selects a mode of a GNSS technology based on power available at the GNSS enabled device and a positioning error value associated with the mode of the GNSS technology. The positioning error value associated with the selected mode is less than a specified accuracy threshold. The receiver circuitry calibrates the inertial sensor based on the selected mode of the GNSS technology to track the position of the GNSS enabled device to reduce the overall power consumption at the GNSS enabled device.

18 Claims, 5 Drawing Sheets

(56) References Cited

U.S. PATENT DOCUMENTS

| | | | | |
|---|---|---|---|---|
| 2005/0222768 A1* | 10/2005 | Tauchi | ................... | G01S 19/49 |
| | | | | 701/469 |
| 2009/0278738 A1* | 11/2009 | Gopinath | ................ | G01S 19/34 |
| | | | | 342/357.74 |
| 2011/0140956 A1* | 6/2011 | Henry | ..................... | G01S 19/49 |
| | | | | 342/357.3 |
| 2012/0109517 A1* | 5/2012 | Watanabe | ............... | G01S 19/49 |
| | | | | 701/431 |
| 2013/0162468 A1* | 6/2013 | Kim | ........................ | G01S 19/33 |
| | | | | 342/357.25 |
| 2020/0096647 A1* | 3/2020 | Cookman | ............. | G01S 19/246 |

OTHER PUBLICATIONS

IEEE Standard for Inertial Systems Terminology, IEEE Std 1559™—2009, IEEE Aerospace and Electronics Systems Society, 2009 (Year: 2009).*

P.D. Groves, Principles of GNSS, Inertial, and Multisensor Integrated Navigation Systems, Artech House, p. 137-253, 2013 (Year: 2013).*

P. Bolla et al., Dual-frequency signal processing architecture for robust and precise positioning applications, 2018 IEEE/ION Position, Location and Navigation Symposium (PLANS),, p. 72-80, Apr. 2018 (Year: 2018).*

Patrick Henkel, "Calibration of Magnetometers with GNSS Receivers and Magnetometer-Aided GNSS Ambiguity Fixing", Department of Electrical and Computer Engineering, Technische University, Jun. 2017, 13 pages.

* cited by examiner

INERTIAL SENSOR CALIBRATION BASED ON POWER BUDGET

CROSS-REFERENCE TO RELATED APPLICATIONS/INCORPORATION BY REFERENCE

This application claims priority to U.S. Provisional Patent Application Ser. No. 62/624,202 filed on Jan. 31, 2018, the entire content of which is incorporated herein by reference.

FIELD

Various embodiments of the disclosure relate to motion-tracking, navigation, and path detection technology. More specifically, various embodiments of the disclosure relate to a Global navigation satellite system (GNSS) enabled device for inertial sensor initialization and calibration based on the power budget.

BACKGROUND

Recent advancements in satellite-based navigation have led to the development of various position and motion tracking devices that may utilize data transmitted from the satellite vehicles to track the motion of objects/devices in different operating environments. Currently, the position tracking devices utilize a GNSS receiver for position estimation (i.e., a geo-location). Typically, a specific GNSS technology mode, which requires more resources within the GNSS receiver due to its signal structure, may be implemented in the GNSS receiver to maintain the navigation performance in different operating environments. In certain scenarios, the expected navigation performance may vary in different operating environments. In such scenarios, implementation of the specific GNSS technology mode within the GNSS receiver may lead to an increase in power consumption at the GNSS receiver resulting in battery drainage. Additionally, low power availability because of the battery drainage may also affect the overall navigation performance of the GNSS receiver.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A GNSS enabled device for inertial sensor calibration based on power budget is provided substantially as shown in, or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a GNSS enabled device for inertial sensor calibration based on power budget. The GNSS enabled device may include an inertial sensor and receiver circuitry that handles position measurement of the GNSS enabled device. The receiver circuitry selects a mode of a plurality of modes in a GNSS technology supported by the GNSS enabled device. The GNSS technology may be, but is not limited to, a Global Positioning System (GPS), a Global Navigation Satellite System (GLONASS), an Indian Regional Navigation Satellite System (IRNSS), a Beidou System, a Galileo System, or other GNSS technology. The plurality of modes may correspond to different frequency bands of RF signals received by the receiver circuitry from one or more space vehicles in the GNSS technology. For example, the different frequency bands in GPS may be, but are not limited to, L1 (1575.42 MHz), L2 (1227.60 MHz), and L5 (1176.45). The mode may be selected based on available power at the GNSS enabled device and a positioning error value associated with the mode of operation, which is less than an accuracy threshold specified for a particular operating environment. The positioning error value may be specified for each mode of the plurality of modes supported by the GNSS enabled device. The receiver circuitry calibrates the inertial sensor based on the selected mode of the GNSS technology. The calibrated inertial sensor may be then utilized for position measurement for a period for which the receiver circuitry may switch off. The calibration of the inertial sensor with the selected mode may allow the receiver circuitry to remain in switch off state for a longer period. This may significantly reduce the overall power consumption at the GNSS enabled device without an adverse impact on the navigation quality.

Figure 1:
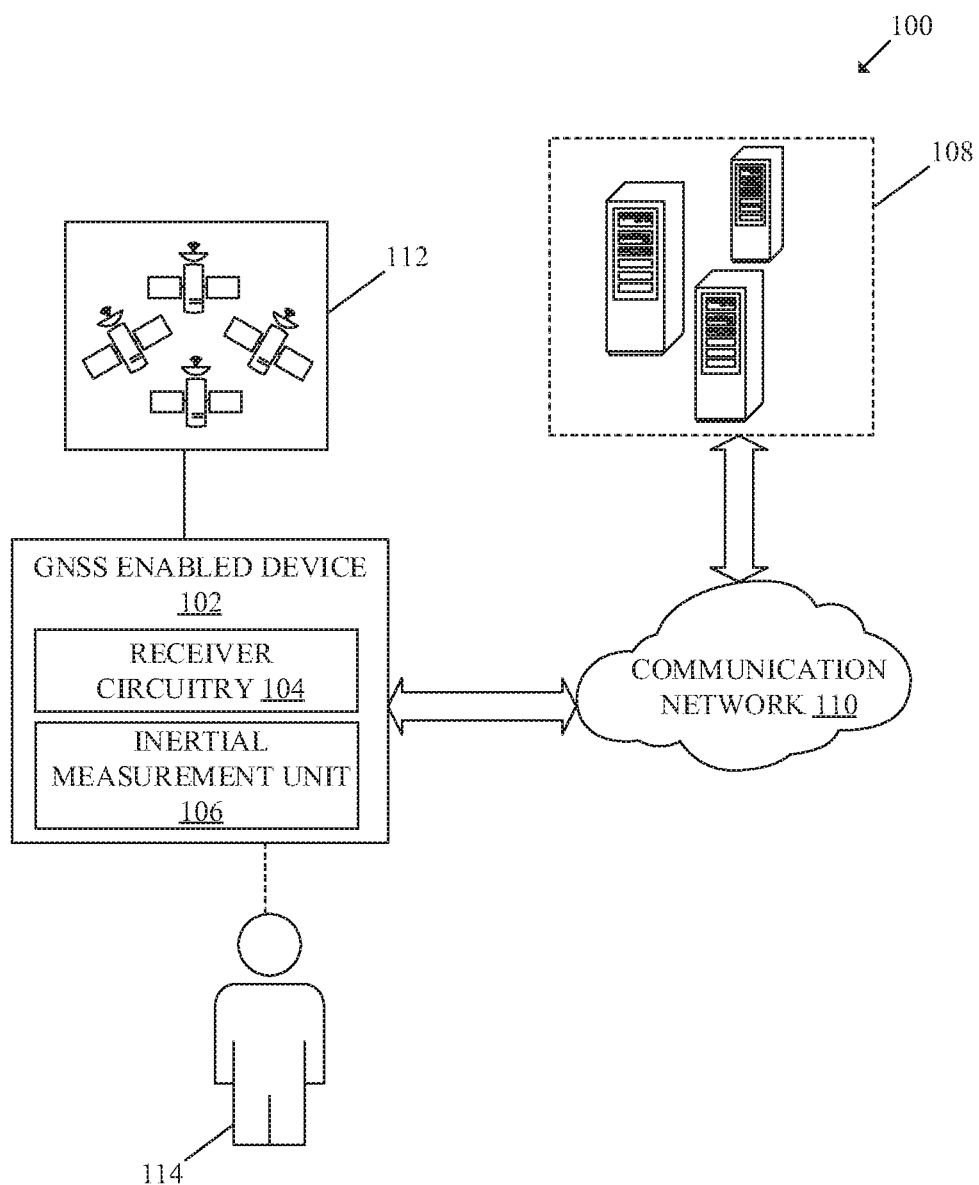
FIG. 1 is a block diagram that illustrates an exemplary network environment for inertial sensor calibration based on power budget, in accordance with an embodiment of the disclosure.

FIG. 1 is a block diagram that illustrates an exemplary network environment for inertial sensor calibration based on power budget, in accordance with an embodiment of the disclosure. With reference to FIG. 1, there is shown a network environment 100. The network environment 100 may include a GNSS enabled device 102, a server 108, a communication network 110, and one or more space-vehicles 112. The GNSS enabled device 102 may be communicatively coupled to the server 108, via the communication network 110. In some scenarios, for example, to receive the positions of the one or more space vehicles 112 quickly (e.g., in Assisted GPS), the GNSS enabled device may also be communicatively coupled to the communication network 110.

The GNSS enabled device 102 may comprise suitable logic, circuitry, and interfaces that may be configured to render and display a motion-path of a user 114 of the GNSS enabled device 102 on a display screen associated with the GNSS enabled device 102. The motion-path may capture different positions of the GNSS enabled device 102 while the user 114 may be engaged in traveling. The GNSS enabled device 102 may provide computational, storage, power, network communication, and other sensor-based resources for tracking of the motion-path and display of the tracked motion-path on a display screen. In some embodiments, the GNSS enabled device 102 may be a portable device held by the user 114. In other embodiments, the GNSS enabled device 102 may be a wearable device worn on a particular part of the body of the user 114. Some exemplary implementations of the GNSS enabled device 102 may include but are not limited to, Advanced Driver Assistance Systems (ADAS), Unmanned Aerial Vehicles (UAVs), and the internet of things (IOT) applications. Examples of the GNSS enabled device 102 may include, but are not limited to, an in-vehicle tracking system, portable devices (such as a smartphone, a laptop, a smart-watch, a digital camera), wearable devices (such as a wearable glass, a wearable headband) and augmented reality/Virtual Reality/Mixed Reality (AR/VR/MR) devices.

The GNSS enabled device 102 may comprise a receiver circuitry 104. The receiver circuitry 104 may be a GNSS receiver. The receiver circuitry 104 may comprise suitable logic, circuitry, and interfaces that may be configured to receive radio frequency (RF) signals from the one or more space vehicles 112 and track the motion-path of the user 114 based on the received RF signals. The receiver circuitry 104 may be installed in a package configuration, which may further specify a form factor of the receiver circuitry 104 in the GNSS enabled device 102. Examples of the package configuration may include, but are not limited to, System on Chip (SoC)-based configuration, Field programmable gate arrays (FPGA)-based configuration, complex programmable logic device (CPLD)-based configuration, System in package (SiP)-based configuration, and Programmable System on Chip (PSoC)-based configuration.

In some embodiments, the receiver circuitry 104 may be implemented as an onboard receiver chip in the GNSS enabled device 102. In other embodiments, the receiver circuitry 104 may be implemented as an application-specific chip that can be attached peripherally to the GNSS enabled device 102. Further, the receiver circuitry 104 may have a specification that describes data formats, protocols, encryptions, and the like. The receiver circuitry 104 may be compatible with various satellite navigation systems to ensure better signal coverage and precise and robust position tracking. Examples of the navigation systems may include, but are not limited to, a Global Positioning System (GPS), a GLObal NAvigation Satellite System (GLONASS), an Indian Regional Navigation Satellite System (IRNSS-NAVIC), a Beidou System, a Galileo System, and a Quasi-Zenith Satellite System (QZSS). It may be noted that the receiver circuitry 104 has been shown as embedded in the GNSS enabled device 102. However, the disclosure may not be so limited and the receiver circuitry 104 may be implemented as a standalone device or chip, without a deviation from the scope of the disclosure.

The GNSS enabled device 102 may also comprise an inertial measurement unit (IMU) 106. The IMU 106 may be integrated with the receiver circuitry 104. The IMU 106 may also be referred to as an inertial navigation system. The IMU 106 may comprise suitable logic, circuitry, and interfaces that may be configured to track the position, orientation, or velocity of the GNSS enabled device 102. The receiver circuitry 106 may be installed in a package configuration, which may further specify a form factor of the receiver circuitry 104 in the GNSS enabled device 102. Examples of the package configuration may include, but are not limited to, System on Chip (SoC)-based configuration, Field programmable gate arrays (FPGA)-based configuration, complex programmable logic device (CPLD)-based configuration, System in package (SiP)-based configuration, and Programmable System on Chip (PSoC)-based configuration.

In some embodiments, the IMU 106 may be implemented as an onboard chip in the GNSS enabled device 102. In other embodiments, the receiver circuitry 104 may be implemented as an application-specific chip that can be attached peripherally to the GNSS enabled device 102. Examples of the IMU 106 may include but are not limited to, accelerometers, gyroscopes, magnetometers, and/or other motion sensors, or a combination thereof. It may be noted that the IMU 106 has been shown as embedded in the GNSS enabled device 102. However, the disclosure may not be so limited, and the IMU 106 may be implemented as a standalone device or chip which may be communicatively coupled to the GNSS enabled device 102 via the communication network 110, without a deviation from the scope of the disclosure.

The server 108 may comprise suitable circuitry, and interfaces that may be configured to store a plurality of locations of the GNSS enabled device 102 detected by the receiver circuitry 104 of the GNSS enabled device 102. Additionally, the server 108 may be configured to store data associated with the tracked motion-path of the GNSS enabled device 102. The plurality of detected locations, the tracked motion-path data of the GNSS enabled device 102, and other metadata for the user 114 may be stored in a database in the server 108 in real time or near real time. In some embodiments, the server 108 may be implemented as a cloud server, which may be utilized to execute aforementioned operations of the server 108 through web applications, cloud applications, HTTP requests, database operations, file transfer, gaming operations, and the like.

The communication network 110 may include a communication medium through which the GNSS enabled device 102 may be communicatively coupled to the server 108. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, an expected navigation performance may be specified for the GNSS enabled device 102 in different operating environments. The expected navigation performance may be specified as the permissible error between actual and calculated position, based on application-specific user requirements. A user input may be received at the GNSS enabled device 102 to initialize reception of the RF signals from the one or more space vehicle 112 (i.e, to switch ON the tracking by the receiver circuitry 104). In some embodiments, the specific operating environment, for example, may be a highway, a city, a hilly region, and the like.

Based on the received user input, the receiver circuitry 104 may be configured to select a mode from a plurality of modes of a GNSS technology, which may represent a frequency band of RF signals transmitted from one or more space vehicles 112. The mode of the GNSS technology may be selected based on an available power at the GNSS enabled device 102 and a positioning error value associated with the mode. The positioning error value may be specified for each mode of the GNSS technology based on prior experimentations. The mode of the GNSS technology may be selected in a case where the positioning error value associated with the mode is less than the expected navigation performance in the particular operating environment. The plurality of modes may include, but are not limited to, a GPS L1 mode, a GPS dual frequency L1 and L5 mode, and a GPS L5 mode. Each mode of the GNSS technology may have a power dissipation rating, which may be inversely proportional to the positioning error value. This may be because the mode with lower positioning error value (i.e., high navigation performance) may demand more resources within the receiver circuitry 104 due to a higher transmission rate and longer code length (e.g. pseudorandom number (PRN) code length). Alternatively stated, a mode (e.g., GPS L5 mode) with lower positioning error value (i.e., high navigation performance) may consume more power as compared to another mode (e.g. GPS L1 mode) with higher positioning error value (i.e., lower navigation performance). The GPS L5 mode may have a higher transmission rate and longer PRN code length as compared to the GPS L1 mode.

After mode selection, the receiver circuitry 104 may be configured to receive RF signals (e.g., GPS navigation signals) from the one or more space vehicles 112 in the selected mode of the GNSS technology. The receiver circuitry 104 may down-convert the received RF signals to intermediate frequency (IF) signals. The down-converted IF signals may be further converted to analog baseband signals, which may be further digitized as digital baseband signals (hereinafter "baseband signals").

The receiver circuitry 104 may acquire a position of the GNSS enabled device 102. The receiver circuitry 104 may acquire the position of the GNSS enabled device 102 for a specified time period. The acquisition of the position of the GNSS enabled device 102 by the receiver circuitry 104 indicates an ON state of the receiver circuitry 104. In the ON state, the receiver circuitry 104 may be activated for tracking the position of the GNSS enabled device 102. The time period for the ON state may be specified based on the expected navigation performance.

The receiver circuitry 104 may provide accurate measurements with a low update rate (e.g., 1 Hz). In certain scenarios, the RF signals may be blocked or have poor quality in some operating environments which may lead to unreliability or even loss of positioning. In such scenarios, the IMU 106 may be utilized in integration with the receiver circuitry 104 to improve the overall positioning experience. The IMU 106 may provide measurements at high update rate (e.g., 50 to 1000 Hz). However, the IMU 106 may also provide an error, which may increase over time due to drift and noise. For this reason, the calibration of inertial sensors in the IMU 106 may be required.

The receiver circuitry 104 may automatically switch to an OFF state for a specified time period. The time period for the OFF state may also be specified based on the expected navigation performance. Before switching to the OFF state, the receiver circuitry 104 may be configured to calibrate an inertial sensor of the IMU 106 based on the baseband signals corresponding to the selected mode of the GNSS technology. The calibration of the inertial sensor of the IMU 106 may allow the receiver circuitry 104 to switch to the OFF state.

In the OFF state, the IMU 106 may be configured to track the position of the GNSS enabled device 102 based on the calibrated inertial sensor. The power consumption by the IMU 106 may be comparatively less as compared to that of the receiver circuitry 104, as the continuous reception of RF signals may not be required in the IMU 106. The position tracking with the IMU 106 may provide a significant drop in the power consumption, which in result elongates the available battery life (i.e., power availability) of the GNSS enabled device 102. However, there may be a tendency to keep the receiver circuitry 104 in the OFF state to reduce the power consumption, but typically the inertial sensor drifts over time (i.e., the positioning error increases over time). Thus, the receiver circuitry 104 may be required to switch to the ON state again after the elapse of the time period of the OFF state.

The receiver circuitry 104 may be further configured to adaptively control the time periods for the ON state and the OFF state based on a change in operating environment. The adaptive control may ensure the expected navigation performance is maintained in all types of operating environments. With the adaptive control, the time periods for the ON and the OFF state may be reduced in an operating environment (e.g. city environment) in which high navigation performance may be required. The operating environment, in which high navigation performance may be required, may be an environment where a signal blockage of the baseband signals may be present. The signal blockage may refer to the various instances where the baseband signals may be affected by an object (e.g., water surface, blanking signal from another onboard component, building, and other signal obstructing objects).

In accordance with an embodiment, the receiver circuitry 104 may be further configured to switch from a first mode of the GNSS technology to a second mode of the GNSS technology, based on a switching power threshold that may correspond to current available power at the GNSS enabled device 102. The switching power threshold may be specified in advance based on application-specific requirements. In a case where the power available at the GNSS enabled device 102 may be greater than the switching power threshold, the receiver circuitry 104 may select the first mode (e.g., L5 mode in case of GPS technology) of the GNSS technology, which may have a better navigation performance. The receiver circuitry 104 may be configured to monitor the power available at the GNSS enabled device 102. When the power available at the GNSS enabled device 102 may be less than the switching power threshold, the receiver circuitry 104 may switch from the first mode of the GNSS technology to a second mode (e.g., L1 mode in case of GPS technology) of the GNSS technology, which may consume less power as compared to the first mode.

In accordance with an embodiment, the plurality of modes may also include a Real-time Kinematic (RTK) mode supported by the receiver circuitry 104. The RTK mode may further enhance the accuracy in the position measurements by the receiver circuitry 104. In other words, the overall positioning error may be further reduced as compared to other modes in the plurality of modes. For example, the positioning error in the RTK mode may be 0.2 meter (m) as compared to GPS L1 mode which may have a 12 m error. In the RTK mode, the receiver circuitry 104 may be further configured to compute the phase of the RF signals in addition to the information content of the RF signals. The receiver circuitry 104 may be further configured to utilize phase measurements to provide real-time corrections in the position measurements. The positioning error in the RTK mode may be in centimeters. For example, the RTK may provide 20 cm positioning error in measurements.

In accordance with an embodiment, the receiver circuitry 104 may be further configured to receive RF signals from dual frequency bands, which may correspond to two different modes of the GNSS technology. The dual-frequency operation of the receiver circuitry 104 may enable diminishing ionosphere delay effect. The ionosphere delay effect may be group or phase delay introduced in the RF signals while the RF signals travel from the one or more space vehicles 112 through the ionosphere. The delay may also depend on the frequency of the RF signals. Thus, the dual-frequency RF signals may allow the receiver circuitry 104 to estimate the delay, and eliminate the delay effect from the measurement.

In accordance with an embodiment, the receiver circuitry 104 may be further configured to switch between different modes of the GNSS technology based on a change in an operating environment of the GNSS enabled device 102. Different operating environments may have different expected navigation performance based on signal blockage, multipath, and/or interference in a particular operating environment. The multipath may refer to phenomenon introduced by reflections of the RF signals from terrestrial objects (e.g., mountains and buildings) in the operating environment. An operating environment that may include terrestrial objects may require high navigation performance of the receiver circuitry 104 to ensure immunity towards the multipath. For such an operating environment, a certain mode of the GNSS technology (e.g., L5 in GPS) with low positioning error may be selected.

The GNSS enabled device 102 may further comprise a display screen that may be configured to display the tracked position of the GNSS enabled device 102. A motion-path of the user 114 associated with the GNSS enabled device 102 may also be displayed on the display screen based on the tracked position of the GNSS enabled device 102. The tracked position of the GNSS enabled device 102 may be stored in the server 108 that is connected to the device 102 through the communication network 110. Although not shown in FIG. 1, an electronic device (e.g., smartphone, laptop, smartwatch, etc.) may also be associated with the user 114, and may be communicatively coupled to the GNSS enabled device 102, via the communication network 110. The motion path of the user 114 device 102 may further be displayed by the electronic device.

Figure 2:
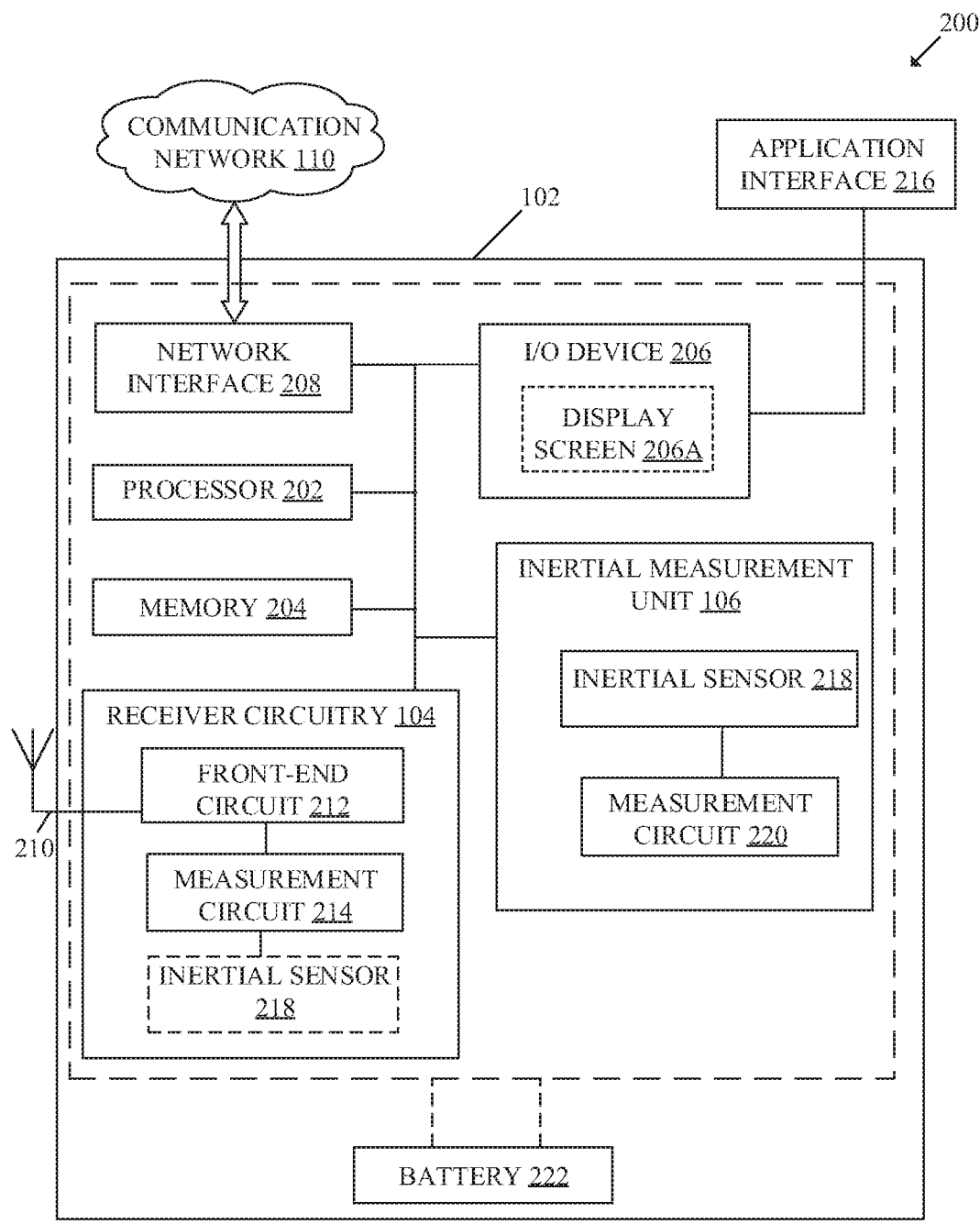
FIG. 2 is a block diagram that illustrates the GNSS enabled device of FIG. 1 with various peripheral components for inertial sensor calibration based on power budget, in accordance with an embodiment of the disclosure.

FIG. 2 is a block diagram that illustrates the GNSS enabled device of FIG. 1 with various peripheral components for inertial sensor calibration based on power budget, in accordance with an embodiment of the disclosure. FIG. 2 is explained in conjunction with elements from FIG. 1. With reference to FIG. 2, there is shown a block diagram 200 of the GNSS enabled device 102. The GNSS enabled device 102 may include the receiver circuitry 104, the IMU 106, a processor 202, a memory 204, an input/output (I/O) device 206, a network interface 208, an antenna 210, and a battery 222. The receiver circuitry 104 may include a front-end circuit 212, and a measurement circuit 214. The I/O device 206 may include a display screen 206A, which may be utilized to render an application interface 216. The IMU 106 may include an inertial sensor 218 and a measurement circuit 220. The processor 202 may be communicatively coupled to the receiver circuitry 104, the memory 204, the IMU 106, the I/O device 206, and the network interface 212. The network interface 212 may be configured to communicate with the server 108, via communication network 110.

The processor 202 may comprise suitable logic, circuitry, interfaces that may be configured to execute a set of instructions stored in the memory 204. The processor 202 may be implemented based on a number of processor technologies known in the art. Examples of the processor 202 may be a Central Processing Unit (CPU), an x86-based processor, an x64-based processor, a Reduced Instruction Set Computing (RISC) processor, an Application-Specific Integrated Circuit (ASIC), a Complex Instruction Set Computing (CISC) processor, a field-programmable gate array-based processor, a specialized digital signal processor (DSP), or other processors, and the like. For example, the CPU and the DSP may work concurrently to detect the position of the device 102. In such a case, the navigation signals may be processed by the DSP, and the CPU may compute the locations of the device 102.

The memory 204 may comprise suitable logic, circuitry, and interfaces that may be configured to store a set of instructions executable by the processor 202. The memory 204 may be configured to store data of operating systems and associated applications. The memory 204 may be further configured to store instructions and control signal data that may be utilized to determine a position of the device 102, during the specific activity of the user 114. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The I/O device 206 may comprise suitable logic, circuitry, and interfaces that may be configured to receive an input from the user 114 and provide an output to the user 114 based on received information from the user 114. For example, the I/O device 208 may be utilized to initialize acquisition of position data or to track the motion-path of the user 114, by the GNSS enabled device 102. The I/O device 206 may comprise various input and output devices, which may be configured to communicate with the processor 202. Examples of the I/O device 208 may include, but are not limited to, a touch screen, a keyboard, a mouse, a joystick, a microphone, a display screen (for example, the display screen 208A), and a speaker.

The display screen 206A may comprise suitable logic, circuitry, and interfaces that may be configured to render the application interface 216 at the display screen 206A, for a presentation of a position of the GNSS enabled device 102 or a motion-path of the user 114 tracked in real time or near real time. In accordance with an embodiment, the display screen 208A may be configured to receive input from the user 114. In such a scenario, the display screen 208A may be a touch screen, which may enable the user 114 to provide input. The touch screen may be at least one of a resistive touch screen, a capacitive touch screen, or a thermal touch screen. In accordance with an embodiment, the display screen 208A may receive the input through a virtual keypad, a stylus, a gesture-based input, or a touch-based input. The display screen 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 208A may refer to a display screen of a smart-glass device, a see-through display, a projection-based display, an electrochromic display, or a transparent display.

The network interface 208 may comprise suitable logic, circuitry, and interfaces that may be configured to facilitate communication between the GNSS enabled device 102, and the server 108, via the communication network 110. The network interface 212 may be implemented by use of various known technologies to support wired or wireless communication of the GNSS enabled device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. In some embodiments, the network interface 208 and the antenna 210 may be an integrated unit. The network interface 208 may communicate via wireless communication with networks, such as the Internet, an Intranet or a wireless network, such as a cellular telephone network, a wireless local area network (LAN), and a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The antenna 210 may comprise suitable logic, circuitry, and interfaces that may be configured to receive the RF signals from one or more space vehicles 112. The antenna 210 may be configured to amplify the received RF signals and transmit to the front-end circuit 212. Examples of the antenna 210 may include, but are not limited to, a Quadrifilar Helix antenna, a Patch antenna, a Microstrip antenna, a Choke Ring antenna, a Spiral Helix antenna, and a Planar ring antenna.

The front-end circuit 212 may comprise suitable logic, circuitry, and interfaces that may be configured to facilitate the acquisition of the RF signals from the one or more space vehicles 112, via the antenna 210 and convert the received RF signals to the baseband signals in the digital domain. Although not shown in FIG. 2, the front-end circuit 212 may include a down-converter and an analog to digital (A/D) converter. The down-converter may be configured to down-convert the received RF signals to IF signals, and further to analog baseband signals. The (A/D) converter may be configured to convert the analog baseband signals to digital baseband signals (hereinafter, "baseband signals").

In some embodiments, the front-end circuit 212 may be implemented as a circuitry coupled externally to the receiver circuitry 104 of the GNSS enabled device 102. In such an implementation, the front-end circuit 212 may include different digital signal processing components communicatively coupled to various analog signal processing components, for example, analog filters, amplifiers, down-converters, A/D converters, and the like. In other embodiments, the front-end circuit 212 may be embedded within the receiver circuitry 104 of the GNSS enabled device 102. Computational resources of the front-end circuit 212 may be shared with the processor 202, or a cluster of processors present within the GNSS enabled device 102, to perform the functions of the front-end circuit 212.

The measurement circuit 214 may comprise suitable logic, circuitry, and interfaces that may be configured to detect a position of the GNSS enabled device 102 from the baseband signals. The measurement circuit 214 may be further configured to generate tracking information related to a motion-path of the user 114 at a defined first frequency of measurement. Such tracking information may be generated based on the computation of displacement between two successive positions. In some embodiments, the measurement circuit 214 may be implemented as a circuitry coupled externally to the receiver circuitry 104 of the GNSS enabled device 102. Computational resources of the measurement circuit 214 may be shared with the processor 202, or a cluster of processors present within the GNSS enabled device 102, to perform the functions of the measurement circuit 214.

Although not shown in FIG. 2, the receiver circuitry 104 may also include a navigation circuit configured to track the motion-path of the user 114, at a defined navigation rate based on tracking information generated by the measurement circuit 214. Alternatively stated, the generated motion path may be updated with one or more detected positions at the defined navigation rate, for example, positions may be updated at "1 Hz" based on "5 Hz" tracking information received from the measurement circuit 214. In some embodiments, the navigation circuit may be implemented as a circuitry coupled externally to the receiver circuitry 104 of the GNSS enabled device 102.

The application interface 216 may correspond to a user interface (UI) rendered on a display screen, such as the display screen 206A. In accordance with an embodiment, the application interface 216 may be further rendered on an electronic device. The application interface 210 may utilize to display the tracked motion-path of the user 114. An example of the application interface 210 may include, but is not limited to, a graphical user interface (GUI).

The inertial sensor 218 may comprise suitable logic, circuitry, and interfaces that may be configured to detect position, speed, direction of motion, angular velocity, and/or orientation of the GNSS enabled device 102 based on the motion of the GNSS enabled device. The inertial sensor 218 may be configured to acquire motion data corresponding to the motion of the GNSS enabled device, which may be further processed to measure the position of the GNSS enabled device 102. The inertial sensor may be a micro-electromechanical system (MEMS) sensor. Examples of the inertial sensor 218 may include but are not limited to, a motion sensor (an accelerometer) and a rotation sensor (a gyroscope).

The measurement circuit 220 may comprise suitable logic, circuitry, and interfaces that may be configured to measure the position of the GNSS enabled device 102 from the motion data acquired by the inertial sensor 218. In some embodiments, the measurement circuit 220 may be implemented as a circuitry coupled externally to the IMU 106 of the GNSS enabled device 102. In such embodiments, the measurement circuit 220 may be the measurement circuit 214 of the receiver circuitry 104. Computational resources of the measurement circuit 220 may be shared with the processor 202 or a cluster of processors present within the GNSS enabled device 102, to perform the functions of the measurement circuit 220.

The battery 222 may comprise one or more electrochemical cells that may be configured to power the GNSS enabled device 102 and its peripheral components such as, the receiver circuitry 104, the IMU 106, the processor 202, the memory 204, the I/O device 206, the network interface 208, and/or the antenna 210. In some embodiments, the battery 222 may be integrated with power electronics or may be connected to power electronics that manage the power supply to the GNSS enabled device 102 and its peripheral components. Examples of battery 222 may include, but are not limited to, flooded lead-acid battery, a deep-cycle lead-acid battery, a valve-regulated lead-acid battery (VRLA), a NiCad battery, a nickel-metal hydride battery, a lithium-ion battery, a Li-ion polymer battery, a zinc-air battery, a molten-salt battery, and other type of power source.

In operation, the GNSS enabled device 102 may be in a particular operating environment, for which the expected navigation performance may be specified by the user 114 as per application requirements. For example, the user 114 may specify the expected navigation performance on a highway as positioning error less than 15 meters (m). A mode of the GNSS technology may be selected from a plurality of modes of the GNSS technology based on the expected navigation performance, and power available at the GNSS enabled device 102. The mode may be selected based on a determination that a specified positioning error value associated with the selected mode satisfies the expected navigation performance. Alternately stated, the specified positioning error value associated with the selected mode may be less than the positioning error corresponding to the expected navigation performance. The mode may be also selected based on a determination that a power consumption associated with the selected mode is minimum among all other modes of the GNSS technology. In other words, a mode from the plurality of modes of the GNSS technology may be selected that may ensure minimum power consumption at the GNSS enabled device and deliver expected navigation performance. The measurement circuit 214 may be configured to select the mode of the GNSS technology based on the expected navigation performance and the available power at the GNSS enabled device 102.

In the selected mode of the GNSS technology, RF signals corresponding to a frequency band of the selected mode may be received at the front-end circuit 212, via the antenna 210 of the receiver circuitry 104. At times, the received RF signals may exhibit significant loss of signal power due to atmospheric conditions, for example, scintillation, propagation, noise addition, absorption or refraction of RF signals due to Ionosphere and Troposphere. Such atmospheric conditions may affect the signal-to-noise ratio (SNR) or sensitivity of the receiver circuitry 104 for the RF signals. The antenna 210 may further amplify the received RF signals and transmit the amplified RF signals to the front-end circuit 212. The down-converter present in the front-end circuit 212 may be configured to down-convert the received RF signals to IF signals. Further, the down-converter may be configured to convert the IF signals to baseband signals. The (A/D) converter may be configured to convert the baseband signals from analog domain to the digital domain. The front-end circuit 212 may be configured to provide the baseband signals in the digital domain to the measurement circuit 214.

The baseband signals may include a coarse/acquisition pseudo-random (C/A PRN) code and a navigation message, which may be decoded by the measurement circuit 214 to measure the position of the GNSS enabled device 102. The navigation message may include ephemeris data, used to calculate the position of each space vehicle in orbit, and information about the time and status of the entire space vehicles constellation. The measurement circuit 214 may be configured to measure the position of the GNSS enabled device 102 based on the ephemeris data.

To improve the overall positioning accuracy, the IMU 106 may be utilized in conjunction with the receiver circuitry 104. The inertial sensor 218 may be configured to acquire motion data of the GNSS enabled device 102 based on the baseband signals. The measurement circuit 220 of the IMU 106 may be configured to measure the position of the GNSS enabled device 102 based on the acquired motion data. In certain scenarios, the RF signals may be blocked or have a poor quality which may lead to unreliability or even loss of positioning. In such scenarios, the measurements from the IMU 106 may be utilized to improve the overall positioning experience. The IMU 106 may provide measurements at high update rate as compared to the receiver circuitry 104. However, the IMU 106 measurements may also include some error, which may increase over time. For this reason, the calibration of inertial sensor 218 in the IMU 106 may be required. The measurement circuit 214 may be further configured to calibrate the inertial sensor 218 based on the baseband signals. Then, the calibrated inertial sensor 218 may be utilized for the measurements. The measurement circuit 214 may be further configured to calibrate the inertial sensor after a fixed time interval continuously.

In accordance with an embodiment, the receiver circuitry 104 may be configured to adaptively switch into an OFF state (sleep mode) for a specified time period, and switch back to the ON state after elapse of the specified time period. This may be required to improve the power efficiency of the GNSS enabled device 102. The receiver circuitry 104 may contribute to the majority of the power consumption at the GNSS enabled device when operated in ON state, due to RF signal reception. To minimize the power consumption, the receiver circuitry may be switched OFF for the specified time period, and the IMU 106 may be relied upon during the OFF state for the position measurements. It should be noted that the time period for the OFF state may be specified based on prior experimentations and/or a current operating environment of the GNSS enabled device 102. The measurement circuit 214 may be further configured to switch the receiver circuitry 104 into the OFF state for the specified time period.

The measurement circuit 214 may be further configured to determine a signal strength of the RF signals in the selected mode of the GNSS technology, every time the ON state is activated. The measurement circuit 214 may be further configured to check whether the signal strength satisfies a threshold value, which may be specified based on the expected navigation performance. In a case where, it is determined that the signal strength does not satisfy the threshold value, the measurement circuit 214 may be configured to select a mode of a different GNSS technology supported by the GNSS enabled device 102. For example, the signal strength for the GNSS enabled device may be specified as −140 dBm, and currently the GNSS enabled device 102 may be connected to GPS "L1" mode with a signal strength of −120 dBm. In one of the ON cycles of the receiver circuitry 104, the received signal strength of the RF signals may be −130 dBm. In such case, the measurement circuit 214 may detect that the signal strength is below the specified threshold value of −120 dBm, and may switch from the GPS to Galileo (or other GNSS) system, which may provide the required signal strength.

In accordance with an embodiment, the measurement circuit 214 may be further configured to change a mode of the GNSS technology based on a switching power threshold that may correspond to power at the GNSS enabled device 102. The switching power threshold may be specified in advance based on application-specific requirements. In a case where, the power available at the GNSS enabled device 102 may be greater than the switching power threshold, the measurement circuit 214 may select the first mode of the GNSS technology, which may have a better navigation performance. The measurement circuit 214 may be configured to monitor the power available at the GNSS enabled device 102. When the power available at the GNSS enabled device 102 may become less than the switching power threshold, the receiver circuitry 104 may change the mode of the GNSS technology from a first mode of the GNSS technology to a second mode of the GNSS technology, which may consume less power as compared to the first mode.

In certain scenarios and at times, due to different factors pertaining to an operating environment, such as multipath, interference, and spoofing, the expected navigation performance may also change with a change in the operating environment. Thus, a mode of the GNSS technology selected in a particular operating environment may not provide the required accuracy in a different operating environment. The measurement circuit 214 may be configured to adaptively change the mode of the GNSS technology based on a change in the operating environment of the GNSS enabled device 102. For example, the mode of the GNSS technology may be changed from GPS "L1" mode in an operating environment with the expected navigation performance within 15 m error limit, to GPS "L5" mode in an operating environment with the expected navigation performance within 2 m error limit. The error limit for the GPS "L1" mode and the GPS "L5" mode may be determined based on prior experimentations as 12 m and 0.2 m. As the 12 m error limit for the GPS "L1" mode exceeds the 2 m error limit in the new operating environment, the receiver circuitry 104 may switch to the GPS "L5' mode in which the error limit is 0.2 m.

In accordance with an embodiment, the ON state time period and the OFF state time period may be also adaptively controlled in accordance with the change in operating environment to maintain the expected navigation performance for the GNSS enabled device 102. The measurement circuit 214 may be configured to control the ON state time period adaptively and the OFF state time period based on the change in the operating environment of the GNSS enabled device 102. If the expected navigation performance in a new operating environment of the GNSS enabled device 102 is higher as compared to the previous operating environment, then the OFF state time period may be reduced and the ON state time period may be increased. This may be done to maintain the expected navigation performance in the new environment. The higher expected navigation performance may correspond to lesser positioning error expected in the new operating environment. For example, the ON state time period and the OFF state time period may be changed from 100 ms and 50 ms, to 125 ms and 25 ms based on a change in an operating environment with the expected navigation performance within 15 m error limit to an operating environment with the expected navigation performance within 2 m error limit.

Figure 3:
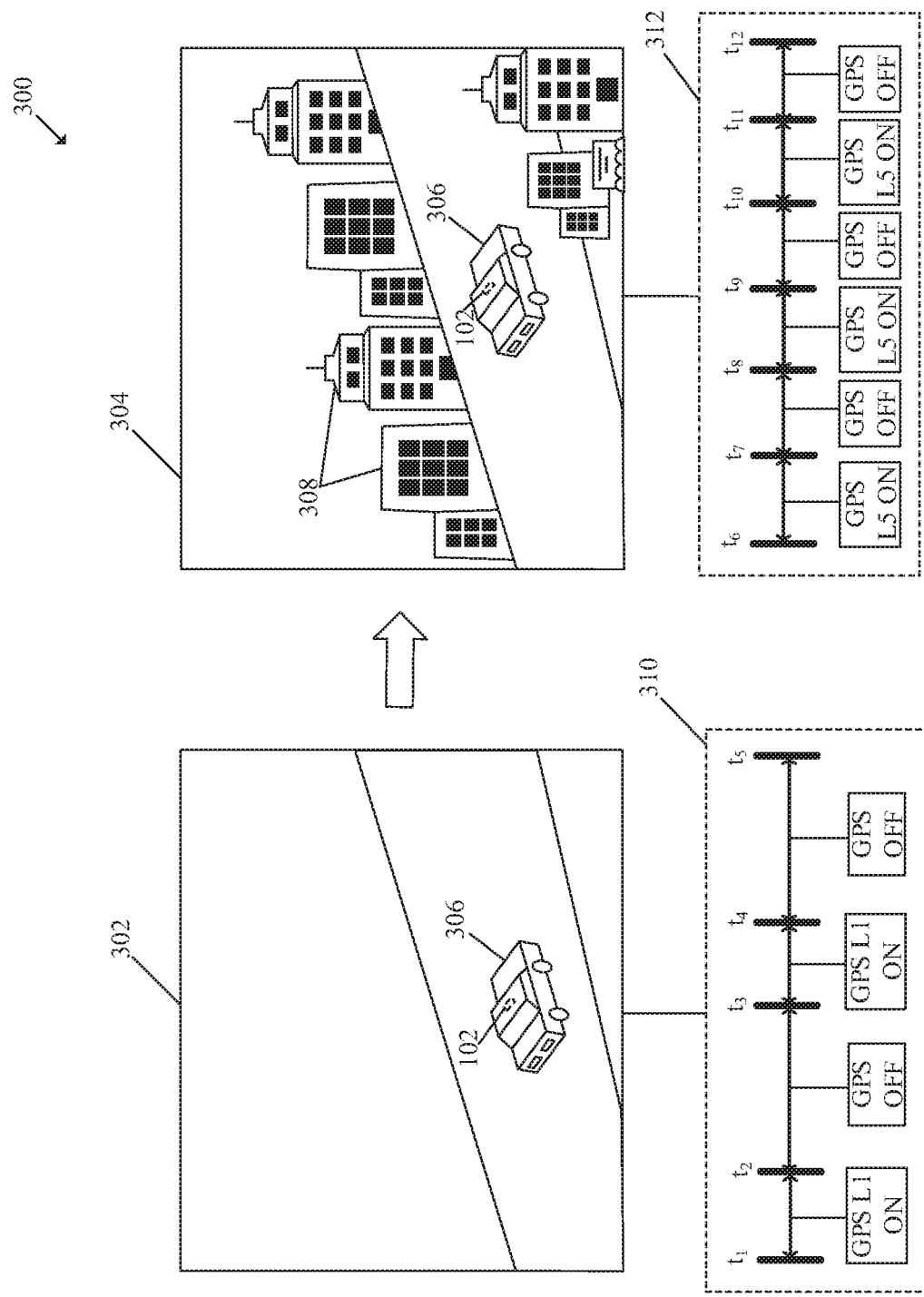
FIG. 3 illustrates an exemplary scenario for implementation of the disclosed GNSS enabled device to depict adaptive switching between different modes in a GNSS receiver of the GNSS enabled device of FIG. 2 to calibrate inertial sensors, in accordance with an embodiment of the disclosure.

FIG. 3 illustrates an exemplary scenario for implementation of the disclosed GNSS enabled device to depict adaptive switching between different modes in a GNSS receiver of the GNSS enabled device of FIG. 2 to calibrate inertial sensors, in accordance with an embodiment of the disclosure. FIG. 3 is explained in conjunction with elements from FIGS. 1 and 2. In accordance with the exemplary scenario as illustrated in FIG. 3, the GNSS enabled device 102 may be a position tracking device. With reference to FIG. 3, there is shown a diagram 300 that includes views corresponding to a first operating environment 302 and a second operating environment 304. There is also shown a vehicle 306 that includes the GNSS enabled device 102. The GNSS enabled device 102 may correspond to a navigation system for the vehicle 306. It may be noted that the vehicle 306 (i.e., a car) is shown as an example. Other examples of the vehicle 306 may include, but are not limited to, wagons, bicycles, motor vehicles (motorcycles, trucks, buses), railed vehicles (trains, trams), watercraft (ships, boats), amphibious vehicles (screw-propelled vehicle, hovercraft), aircraft (airplanes, helicopters), spacecraft, and unmanned aerial vehicles (UAVs).

The first operating environment 302 may be an open environment, which may not be crowded with signal blockage sources, such as terrestrial objects 308 (e.g. mountains and buildings). The first operating environment 302 may be, but is not limited to, a highway or unobstructed geographical area on which the vehicle 306 may be in motion. The receiver circuitry 104 of the GNSS enabled device, based on a trigger input (i.e. a user input), may start the position tracking for the vehicle 306. In some embodiments, the receiver circuitry 104 may start the position tracking as soon as the vehicle 306 starts to move.

The receiver circuitry 104 may acquire location data of the first operating environment 302 from the server 108, via the communication network 110. The location data of the first operating environment 302 may be acquired based on an input from the user 114, which may specify a start location of the vehicle 306. In some embodiments, a map may be pre-stored in the memory 204. The receiver circuitry 104 may extract the location data from the map stored in the memory 204. The expected navigation performance for different operating environments may be specified by the user 114 and may be stored in the memory 204. The expected navigation performance may be a positioning accuracy threshold, which define a navigation or error budget in position. The expected navigation performance (or the positioning accuracy threshold) for the first operating environment 302 may be acquired from the memory 204 based on the location data of the first operating environment 302. In some embodiments, the positioning accuracy threshold may be acquired from the server 108, via the communication network 110. As an example, the positioning accuracy threshold for the first operating environment 302 may be acquired as 20 m error limit.

The GNSS technology supported by the GNSS enabled device 102 may be, but is not limited to, GPS. The plurality of modes of GNSS technology may include, but are not limited to, GPS "L1" mode, GPS "L1" and "L5" mode, and GPS "L5" mode. A positioning error value associated with each mode of the GNSS technology may be specified/stored in the memory 204, based on prior experimentations. For example, the positioning error value for the GPS "L1" mode, GPS "L1" and "L5" mode, and GPS "L5" mode may be specified as 15 m, 2 m, and 0.2 m respectively. The power consumption rating associated with each mode of the GNSS technology may also be defined or stored in the memory 204, based on prior experimentations. The power consumption rating may be inversely proportional to the positioning error value associated with each mode. In other words, the mode with lowest positioning error may consume the maximum power.

The receiver circuitry 104 may select a mode of the GNSS technology from the plurality of modes of the GNSS technology for the first operating environment 302. The mode may be selected based on the power available at the GNSS enabled device 102 and the positioning accuracy threshold of the first operating environment 302. The mode which consumes lesser power and satisfies the positioning accuracy threshold of the first operating environment 302 may be selected. As an example, each of the GPS "L1" mode (15 m), GPS "L1" and "L5" mode (2 m), and GPS "L5" mode (0.2 m) satisfies the positioning accuracy threshold of the first operating environment 302 (i.e., 20 m). The receiver circuitry 104 may select the GPS "L1" mode (15 m) for the first operating environment 302 as the power consumption of the GPS "L1" mode is minimum among all other modes.

In accordance with an embodiment, the receiver circuitry 104 may also determine a first time period (ON state time period) and a second time period (OFF state time period) associated with the first operating environment 302. In the ON state, the receiver circuitry 104 may measure the position of the vehicle 306 based on RF signals received in the GPS "L1" mode. The receiver circuitry 104 may also calibrate the inertial sensor 218 of the IMU 106 based on the RF signals received in the GPS "L1" mode. In the OFF state, the IMU 106 may measure the position of the vehicle 306 based on the calibrated inertial sensor 218.

There is also shown a timeline 310 that depicts the ON state and the OFF state of the receiver circuitry 104 in the first operating environment 302. The first time period may be $t_2$–$t_1$ and the second time period may be $t_3$–$t_2$. The second time period may be determined as greater than the first time period to elongate the life of the battery 222 of the GNSS enabled device 102 (extend the duration for which the battery 222 may supply power). However, the second time period may also be less than or equal to the first time period to maintain the expected navigation performance. After elapse of the second time period (i.e., at time instance $t_3$), the receiver circuitry 104 may again switch back to the ON state, and continue until the time instance $t_4$. The difference between the time instances $t_3$ and $t_4$ may be equal to the first time period (ON state time period). After elapse of the first time period (i.e., at time instance $t_4$), the receiver circuitry 104 may again switch back to the OFF state, and continue until the time instance $t_5$. The difference between the time instances $t_5$ and $t_4$ may be equal to the second time period (OFF state time period). This adaptive switching operation may continue until the user 114 provide a trigger input to stop the operation, or the vehicle 306 reaches the specified destination.

In accordance with the exemplary scenario, there is shown the second operating environment 304 and associated timeline 312. The vehicle 306 may enter the second operating environment 304 at the time instance $t_6$. The second operating environment 304 may be a crowded environment, which includes signal blockage sources, such as the terrestrial objects 308 (e.g., buildings). The second operating environment 304 may include, but is not limited to, a city on which the vehicle 306 may be in motion. The receiver circuitry 104 may detect a change in the operating environment from the first operating environment 302 to the second operating environment 304, based on a change in the location data. The receiver circuitry 104 may acquire the expected navigation performance (or the positioning accuracy threshold) for the second operating environment 304. As an example, the positioning accuracy threshold for the second operating environment 304 may be acquired as 1 m error limit. As the positioning error value associated with GPS "L1" mode (i.e. 15 m) is greater than the positioning accuracy threshold for the second operating environment 304 (i.e., 1 m), the receiver circuitry 104 may switch from the GPS "L1" mode to the GPS "L5" mode. The GPS "L5" mode is selected as the positioning error value associated with GPS "L5" mode (i.e. 0.2 m) is less than the positioning accuracy threshold for the second operating environment 304.

The receiver circuitry 104 may also change the first time period (ON state time period) and the second time period (OFF state time period) based on the change in the operating environment from the first operating environment 302 to the second operating environment 304. In the ON state, the receiver circuitry 104 may measure the position of the vehicle 306 based on RF signals received in the GPS "L5" mode. The receiver circuitry 104 may also calibrate the inertial sensor 218 of the IMU 106 based on the RF signals received in the GPS "L5" mode. In the OFF state, the IMU 106 may measure the position of the vehicle 306 based on the calibrated inertial sensor 218.

The timeline 312 depicts the ON state and the OFF state of the receiver circuitry 104 in the second operating environment 304. The first time period may be $t_7$–$t_6$ and the second time period may be $t_8$–$t_7$. The first time period $t_7$–$t_6$ may be greater than or equal to the first time period $t_2$–$t_1$ in the first operating environment 302. The second time period $t_8$–$t_7$ may be less than the second time period $t_3$–$t_2$ in the first operating environment 302. The receiver circuitry 104 may remain in the ON state (GPS "L5" mode) for the first time period $t_7$–$t_6$. After elapse of the first time period (i.e., at time instance $t_7$), the receiver circuitry 104 may switch to the OFF state, and continue until the time instance $t_8$. The difference between the time instances $t_7$ and $t_8$ may be equal to the second time period (OFF state time period). After elapse of the second time period (i.e., at time instance $t_8$), the receiver circuitry 104 may again switch back to the ON state, and continue until the time instance $t_9$. The difference between the time instances $t_8$ and $t_9$ may be equal to the first time period (ON state time period). After elapse of the first time period (i.e., at time instance $t_9$), the receiver circuitry 104 may again switch back to the OFF state, and continue until the time instance $t_{10}$. The difference between the time instances $t_9$ and $t_{10}$ may be equal to the second time period (OFF state time period). This switching operation may continue until the user 114 provide a trigger input (i.e., user input) to stop the operation, or the vehicle 306 reaches the specified destination. For example, at the time instance $t_{12}$, the tracking operation may end.

Although the exemplary scenario as illustrated by FIG. 3 exhibits the GNSS enabled device 102 installed in the vehicle 306 in accordance with an embodiment, the GNSS enabled device 102 may also be a portable device carried by the user 114. Examples of such portable devices may be, but not limited to, a smartphone, tablet, PC, laptop, wearable smart devices, and AR/VR devices.

Figure 4A:
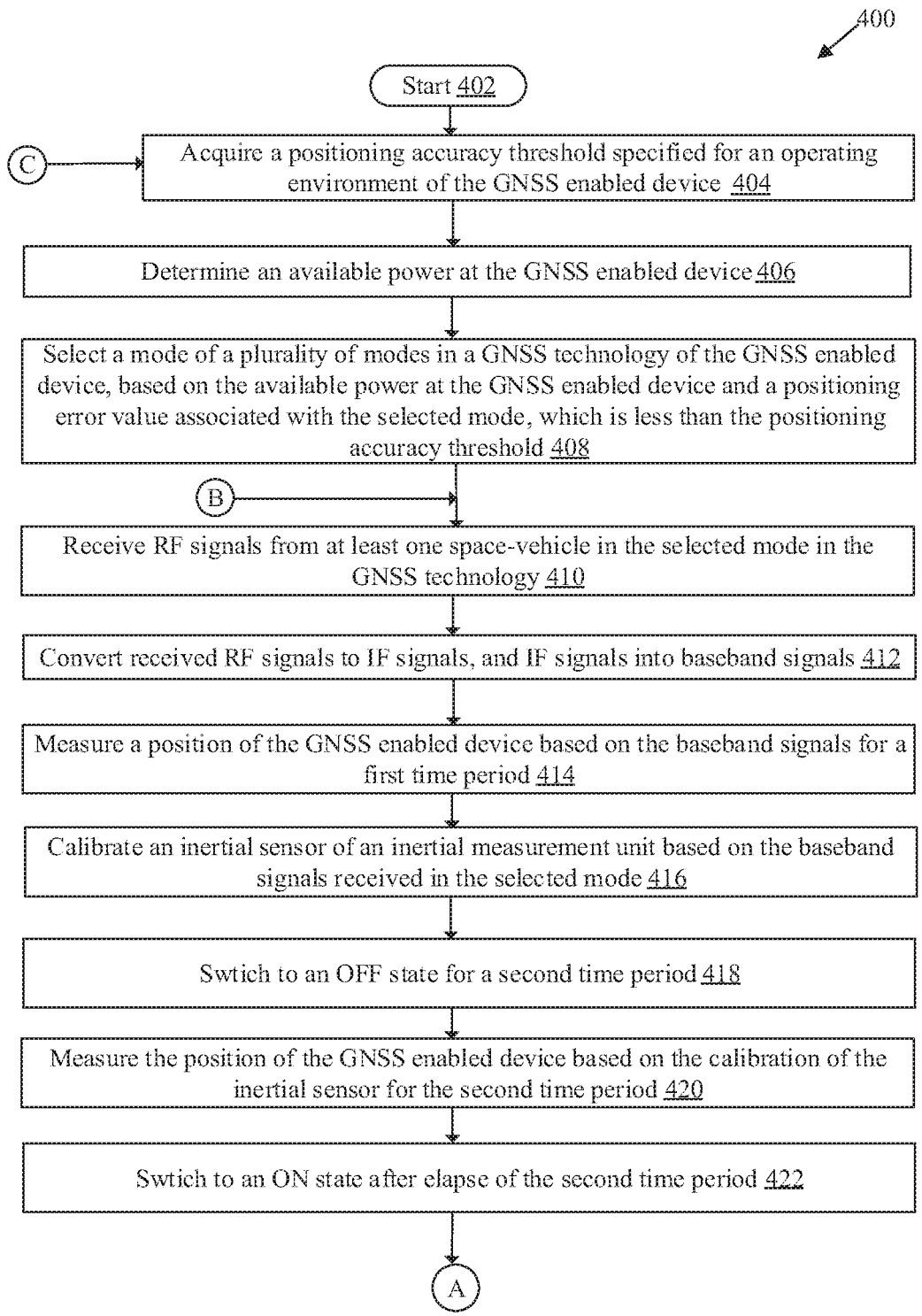
FIGS. 4A and 4B, collectively, depicts a flowchart that illustrates an exemplary method for inertial sensor calibration based on power budget, in accordance with an embodiment of the disclosure.
Figure 4B:
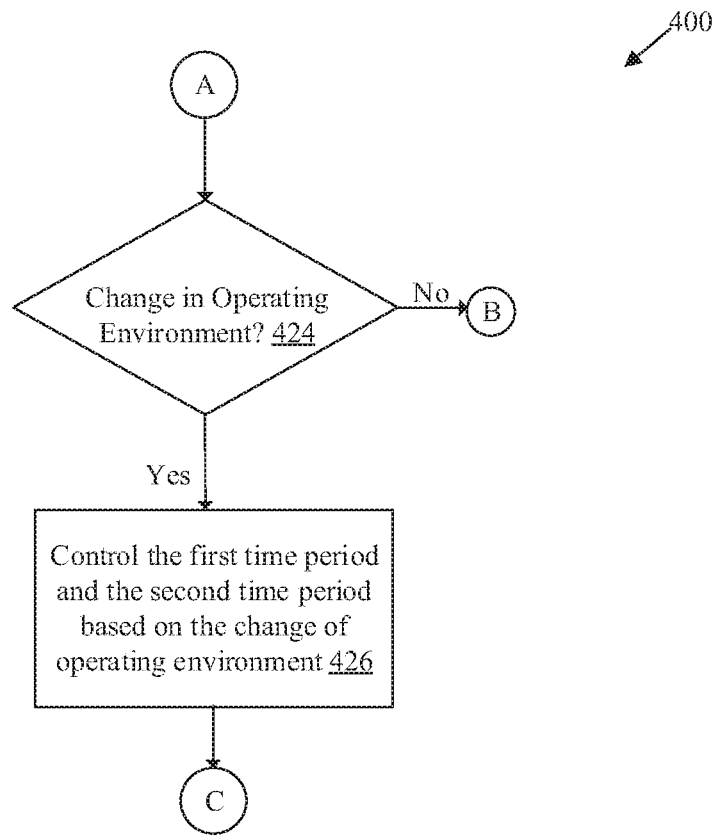

FIGS. 4A and 4B, collectively, is a flowchart that illustrates an exemplary method for inertial sensor calibration based on power budget, in accordance with an embodiment of the disclosure. FIGS. 4A and 4B are explained in conjunction with elements from FIGS. 1, 2, and 3. With reference to FIGS. 4A and 4B, there is shown a flowchart 400 implemented in the GNSS enabled device 102. The method starts at 402 and proceeds to 404.

At 404, a position accuracy threshold specified for an operating environment of the GNSS enabled device 102 may be acquired. The position accuracy threshold may correspond to the expected navigation performance in the operating environment. The receiver circuitry 104 may be configured to acquire a position accuracy threshold specified for an operating environment of the GNSS enabled device 102.

At 406, an available power at the GNSS enabled device 102 may be determined. The available power at the GNSS enabled device 102 may be an amount of charge available in the battery 222 of the GNSS enabled device 102. The receiver circuitry 104 may be configured to determine the available power at the GNSS enabled device 102.

At 408, a mode of a plurality of modes of a GNSS technology of the GNSS enabled device 102 may be selected based on the available power at the GNSS enabled device and a positioning error value associated with the selected mode. The positioning error value associated with the selected mode may be less than the positioning accuracy threshold. The plurality of modes may correspond to different frequencies of RF signals that may be received by the receiver circuitry 104. The receiver circuitry 104 may be configured to select a mode of the plurality of modes in the GNSS technology of the GNSS enabled device 102 based on the available power at the GNSS enabled device and the positioning error value associated with the selected mode.

At 410, RF signals in the selected mode of the GNSS technology may be received from at least one space vehicle. The frequency of received the RF signals may correspond to the selected mode of the plurality of modes. The at least one space vehicle may be associated with a particular GNSS technology. The receiver circuitry 104 may be configured to receive RF signals in the selected mode of the GNSS technology from at least one space vehicle.

At 412, the received RF signals may be down-converted to IF signals, and further the IF signals may be converted into baseband signals. The baseband signals may comprise navigation message required to measure the position of the GNSS enabled device 102. The receiver circuitry 104 may be configured to convert the received RF signals to IF signals, and further the IF signals into baseband signals.

At 414, a position of the GNSS enabled device 102 may be measured based on the baseband signals for a first time period. The position of GNSS enabled device 102 may be measured by decoding the navigation message included in the baseband signals. The measurement of the position of the GNSS enabled device by the receiver circuitry 104 may correspond to an ON state of the receiver circuitry 104. The first time period corresponding to the ON state may be specified in accordance with the operating environment. The receiver circuitry 104 may be configured to the position of the GNSS enabled device 102 based on the baseband signals for the first time period.

At 416, an inertial sensor of the IMU 106 may be calibrated based on the baseband signals corresponding to the selected mode of the GNSS technology. The calibrated inertial sensor may be then utilized for position measurement. The receiver circuitry 104 may be configured to calibrate the inertial sensor of the IMU 106 based on the baseband signals corresponding to the selected mode of the GNSS technology.

At 418, the receiver circuitry 104 may be switched into an OFF state for a second time period. The second time period corresponding to the OFF state may be specified in accordance with the operating environment. The receiver circuitry 104 may be configured to switch to the OFF state for the second time period.

At 420, the position of the GNSS enabled device 102 may be measured for the second time period based on the calibration of the inertial sensor. The inertial sensor of the IMU 106 may be configured to acquire motion data of the GNSS enabled device 102. In the OFF state of the receiver circuitry 104, the IMU 106 may be configured to measure the position of the GNSS enabled device 102 based on the inertial sensor calibration in the selected mode of the GNSS enabled device.

At 422, the receiver circuitry 104 may be switched back into the ON state after elapse of the second time period. The process of switching of the receiver circuitry 104 from the ON state to the OFF state and again back to the ON state may ensure that power consumption at the GNSS enabled device is minimized. The receiver circuitry 104 may be configured to switch to the ON state after elapse of the second time period.

At 424, it may be determined whether there is a change in operating environment of the GNSS enabled device 102 or not. A change in the mode of the GNSS technology may be required as the operating environment of the GNSS enabled device 102 changes. The receiver circuitry 104 may be configured to determine whether there is a change in operating environment of the GNSS enabled device 102. In cases where the operating environment of the GNSS enabled device 102 changes, then the control passes to 426, or else the control passes to 410.

At 426, the first time period and the second time period may be controlled based on the change of the operating environment of the GNSS enabled device 102. The second time period for the OFF state may be reduced and the first time period for the ON state may be increased in a new operating environment for which the positioning accuracy threshold is less as compared to previous operating environment. The receiver circuitry 104 may be configured to control the first time period and the second time period based on the change of the operating environment of the GNSS enabled device 102. The control may pass to 404.

Certain embodiments of the disclosure may be found in a global navigation satellite system (GNSS) (e.g., the GNSS enabled device 102 (FIG. 1)). Various embodiments of the disclosure may provide the GNSS enabled device that may include an inertial sensor (e.g., the inertial sensor 218 (FIG. 2)) and a receiver circuitry (e.g., the receiver circuitry 104 (FIG. 1)). The receiver circuitry may be configured to select a first mode of the plurality of modes in a first GNSS technology of the GNSS enabled device, based on an available power at the GNSS enabled device and a positioning error value associated with the first mode. The positioning error value may be specified for each mode of the plurality of modes supported at the GNSS enabled device. The first mode of the plurality of modes may be selected based on the positioning error value associated with the first mode that is less than a specified position accuracy threshold. The receiver circuitry may be further configured to calibrate the inertial sensor based on the selected first mode in the first GNSS technology of the GNSS enabled device.

In accordance with an embodiment, the receiver circuitry may be further configured to switch from the first mode to a second mode of the plurality of modes based on power consumption associated with the plurality of modes and the available power at the GNSS enabled device. The receiver circuitry may be further configured to determine that the available power at the GNSS enabled device is less than a threshold value. The receiver circuitry may be further configured to switch from the first mode to the second mode of the plurality of modes based on the determination that the available power at the GNSS enabled device is less than the threshold value. The power consumption associated with the second mode may be less than the power consumption associated with the first mode.

In accordance with an embodiment, the receiver circuitry may be in an OFF state. In the OFF state, the inertial sensor may be configured to acquire motion data of the GNSS enabled device to measure the position of the GNSS enabled device. The receiver circuitry may be further configured to switch to an ON state for a first time period from the OFF state, and measure the position of the GNSS enabled device in the ON state. The receiver circuitry may be further configured to switch to the OFF state for a second time period. The receiver circuitry may be further configured to control the second time period based on the specified position accuracy threshold and an operating environment of the GNSS enabled device. The specified position accuracy threshold may be different for different type of operating environments of the GNSS enabled device. The receiver circuitry may be further configured to decrease the second time period based on a change of the operating environment of the GNSS enabled device from a first operating environment to a second operating environment. The specified position accuracy threshold of the measurement of the position of the GNSS enabled device in the second operating environment may be less than the specified position accuracy threshold in the first operating environment.

In accordance with an embodiment, the receiver circuitry may be further configured to determine that the positioning error value associated with the first mode exceeds the specified position accuracy threshold based on a change in an operating environment of the GNSS enabled device from a first operating environment to a second operating environment. The specified position accuracy threshold for the second operating environment may be less than the specified position accuracy threshold for the first operating environment. The receiver circuitry may be further configured to switch from the first mode to a second mode of the plurality of modes based on the determination that the positioning error value associated with the first mode exceeds the specified position accuracy threshold. The positioning error value associated with the second mode may be less than the specified position accuracy threshold.

In accordance with an embodiment, the receiver circuitry may be further configured to receive radio frequency (RF) signals from at least one space-vehicle in the first GNSS technology. The plurality of modes may correspond to different frequencies of the RF signals. The plurality of modes may comprise the first mode, a second mode, and a third mode. In the first mode, the RF signals may have a first frequency. In the second mode the RF signals may have a second frequency different from the first frequency. In the third mode, the RF signals may have the first frequency and the second frequency. The second frequency may be less than the first frequency, and the power consumption associated with the first mode may be less than the power consumption associated with the second mode. The positioning error value associated with the first mode may be higher than the positioning error value associated with the second mode.

In accordance with an embodiment, the receiver circuitry may be further configured to determine that a signal strength of RF signals in the first GNSS technology is less than a threshold value. The receiver circuitry may be further configured to switch from the first GNSS technology to a second GNSS technology based on the determination that the signal strength of the first GNSS technology is less than the threshold value. The first GNSS technology may be global positioning system (GPS) and the second GNSS technology may be one of Global Navigation Satellite System (GLONASS), Indian Regional Navigation Satellite System (IRNSS, NAVIC), Beidou System, Quasi-Zenith Satellite System (QZSS), Galileo System, or other GNSS technology.

Certain embodiments of the disclosure may be found in a global navigation satellite system (GNSS) (e.g., the GNSS enabled device 102 (FIG. 1)). Various embodiments of the disclosure may provide the GNSS enabled device that may include an inertial sensor (e.g., the inertial sensor 218 (FIG. 2)) and a receiver circuitry (e.g., the receiver circuitry 104 (FIG. 1)). The inertial sensor may be configured to acquire motion data of the GNSS enabled device. The receiver circuitry may be configured to select a first mode of the plurality of modes in a first GNSS technology of the GNSS enabled device, based on an available power at the GNSS enabled device and a positioning error value associated with the first mode. The positioning error value may be specified for each mode of the plurality of modes supported at the GNSS enabled device. The first mode of the plurality of modes may be selected based on the positioning error value associated with the first mode that is less than a specified position accuracy threshold. The receiver circuitry may be further configured to receive radio frequency (RF) signals from at least one space-vehicle in the first mode of the first GNSS technology for a first time period. The receiver circuitry may be further configured to calibrate the inertial sensor based on the received RF signals in the first mode of the first GNSS technology. The calibrated inertial sensor may be configured to measure position of the GNSS enabled device for a second time period based on the acquired motion data.

The present disclosure provides several advantages over the prior arts. The present disclosure facilitates precise detection and tracking of positions of the user in all type of operating environments. The adaptive selection of the mode of GNSS technology in accordance with the operating environment facilitates faster output with lower power consumption, as compared to conventional receivers that utilize significant power to provide position measurements in a particular mode of GNSS technology in all type of operating environments. The power consumption is further minimized by allowing the receiver circuitry 104 to go into an OFF state and then utilizing the calibrated inertial sensor of the IMU 106 for position measurements. As the power consumption of the receiver circuitry 104 is optimal, power load on the battery 222 of the device 102 is minimized, and therefore, the device 102 may be rendered for use in multitasking applications for an increased duration of time. The receiver circuitry 104 advantageously captures motion-path the user 114 at a higher rate even with the intermittent loss of signals due to recurrent signal blockages in different operating environments. Use of adaptive control of the ON state time period and the OFF state time period advantageously compensates the intermittent drop in an optimal measurement of positions with the movement of the GNSS enabled device 102 in different operating environments. Such compensation may advantageously facilitate continuous output of high definition/high-resolution location points, which may further help preserve integrity, sensitivity, and throughput of the disclosed receiver.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions The present disclosure may also be embedded in a computer program product, which comprises all the features that enable the implementation of the methods described herein, and which when loaded in a computer system can carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A global navigation satellite system (GNSS) enabled device, comprising:
   an inertial sensor; and
   a receiver circuitry configured to:
      determine an amount of power available at the GNSS enabled device;
      select a first mode of a plurality of modes in a first GNSS technology of the GNSS enabled device, wherein
         a positioning error value is specified for each mode of the plurality of modes supported at the GNSS enabled device,
         the first mode of the plurality of modes is selected based on the amount of the power available at the GNSS enabled device and the positioning error value associated with the first mode, and
         the positioning error value associated with the first mode is less than a specified position accuracy threshold;
      calibrate the inertial sensor based on the selected first mode in the first GNSS technology of the GNSS enabled device;
      switch from the first mode to a second mode of the plurality of modes based on the amount of the power available at the GNSS enabled device and power consumption associated with each of the plurality of modes, wherein the power consumption associated with the second mode in the first GNSS technology is less than the power consumption associated with each of remaining modes of the plurality of modes in the first GNSS technology;
      switch to an OFF state for a first time period in the second mode, wherein
         in the OFF state, the inertial sensor is configured to acquire motion data of the GNSS enabled device to measure a position of the GNSS enabled device; and
      control the first time period based on the specified position accuracy threshold and an operating environment of the GNSS enabled device.

2. The GNSS enabled device according to claim 1, wherein the receiver circuitry is further configured to:
   determine that the amount of the power available at the GNSS enabled device is less than a threshold value; and
   switch from the first mode to the second mode of the plurality of modes based on the determination that the amount of the power available at the GNSS enabled device is less than the threshold value.

3. The GNSS enabled device according to claim 1, wherein
   the receiver circuitry is further configured to:
      switch to an ON state for a second time period from the OFF state; and
      measure the position of the GNSS enabled device in the ON state.

4. The GNSS enabled device according to claim 1, wherein
   the specified position accuracy threshold is different for different type of operating environments of the GNSS enabled device.

5. The GNSS enabled device according to claim 4, wherein
   the receiver circuitry is further configured to decrease the first time period based on a change of the operating environment of the GNSS enabled device from a first operating environment to a second operating environment, and
   the specified position accuracy threshold for the measurement of the position of the GNSS enabled device in the second operating environment is less than the specified position accuracy threshold in the first operating environment.

6. The GNSS enabled device according to claim 1, wherein the receiver circuitry is further configured to:
   determine that the positioning error value associated with the second mode exceeds the specified position accuracy threshold based on a change in the operating environment of the GNSS enabled device from a first operating environment to a second operating environment, wherein the specified position accuracy threshold for the second operating environment is less than the specified position accuracy threshold for the first operating environment; and
   switch from the second mode to a third mode of the plurality of modes based on the determination that the positioning error value associated with the second mode exceeds the specified position accuracy threshold, wherein the positioning error value associated with the third mode is less than the specified position accuracy threshold.

7. The GNSS enabled device according to claim 1, wherein
   the receiver circuitry is further configured to receive radio frequency (RF) signals from at least one space-vehicle in the first GNSS technology, and
   the plurality of modes corresponds to different frequencies of the RF signals.

8. The GNSS enabled device according to claim 7, wherein
   the plurality of modes comprises the first mode, the second mode, and a third mode,
   in the first mode, the RF signals have a first frequency,
   in the second mode, the RF signals have a second frequency different from the first frequency, and
   in the third mode, the RF signals comprise the first frequency and the second frequency.

9. The GNSS enabled device according to claim 8, wherein the first frequency is less than the second frequency.

10. The GNSS enabled device according to claim 8, wherein
the first frequency is less than the second frequency, and
the positioning error value associated with the second mode is higher than the positioning error value associated with the first mode.

11. The GNSS enabled device according to claim 1, wherein the receiver circuitry is further configured to:
determine that a signal strength of RF signals in the first GNSS technology is less than a threshold value; and
switch from the first GNSS technology to a second GNSS technology based on the determination that the signal strength of the first GNSS technology is less than the threshold value.

12. The GNSS enabled device according to claim 11, wherein the first GNSS technology is global positioning system (GPS) and the second GNSS technology is one of Global Navigation Satellite System (GLONASS), Indian Regional Navigation Satellite System (IRNSS-NAVIC), Beidou System, Quasi-Zenith Satellite System (QZSS), Galileo System, or other GNSS technology.

13. A global navigation satellite system (GNSS) enabled device, comprising:
an inertial sensor configured to acquire motion data of the GNSS enabled device; and
a receiver circuitry configured to:
determine an amount of power available at the GNSS enabled device;
select a first mode of a plurality of modes in a first GNSS technology of the GNSS enabled device, wherein
a positioning error value is specified for each mode of the plurality of modes supported at the GNSS enabled device,
the first mode of the plurality of modes is selected based on the amount of the power available at the GNSS enabled device and the positioning error value associated with the first mode, and
the positioning error value associated with the first mode is less than a specified position accuracy threshold;
receive radio frequency (RF) signals from at least one space-vehicle in the first mode of the first GNSS technology for a first time period;
calibrate the inertial sensor based on the received RF signals in the first mode of the first GNSS technology,
wherein the calibrated inertial sensor is configured to measure a position of the GNSS enabled device for a second time period based on the acquired motion data;
switch from the first mode to a second mode of the plurality of modes based on the amount of the power available at the GNSS enabled device and power consumption associated with each of the plurality of modes, wherein the power consumption associated with the second mode in the first GNSS technology is less than the power consumption associated with each of remaining modes of the plurality of modes in the first GNSS technology;
switch to an OFF state for the second time period in the second mode; and
control the second time period based on the specified position accuracy threshold and an operating environment of the GNSS enabled device.

14. The GNSS enabled device according to claim 13, wherein the receiver circuitry is further configured to:
determine that the amount of the power available at the GNSS enabled device is less than a threshold value; and
switch from the first mode to the second mode of the plurality of modes based on the determination that the amount of the power available at the GNSS enabled device is less than the threshold value.

15. The GNSS enabled device according to claim 13, wherein
the receiver circuitry is further configured to control the first time period based on the specified position accuracy threshold and the operating environment of the GNSS enabled device
the specified position accuracy threshold is different for different type of operating environments of the GNSS enabled device.

16. The GNSS enabled device according to claim 15, wherein
the receiver circuitry is further configured to decrease the second time period based on a change of the operating environment of the GNSS enabled device from a first operating environment to a second operating environment, and
the specified position accuracy threshold for the measurement of the position of the GNSS enabled device in the second operating environment is less than the specified position accuracy threshold in the first operating environment.

17. A method, comprising:
in a global navigation satellite system (GNSS) enabled device that comprises an inertial sensor and a receiver circuitry:
determining, by the receiver circuitry, an amount of power available at the GNSS enabled device;
selecting, by the receiver circuitry, a first mode of a plurality of modes in a first GNSS technology of the GNSS enabled device, wherein
a positioning error value is specified for each mode of the plurality of modes supported at the GNSS enabled device,
the first mode of the plurality of modes is selected based on the amount of the power available at the GNSS enabled device and the positioning error value associated with the first mode, and
the positioning error value associated with the first mode is less than a specified position accuracy threshold;
calibrating, by the receiver circuitry, the inertial sensor based on the selected first mode in the first GNSS technology; and
switching, by the receiver circuitry, from the first mode to a second mode of the plurality of modes based on the amount of the power available at the GNSS enabled device and power consumption associated with each of the plurality of modes, wherein the power consumption associated with the second mode in the first GNSS technology is less than the power consumption associated with each of remaining modes of the plurality of modes in the first GNSS technology;
switching, by the receiver circuitry, to an OFF state for a time period in the second mode;
acquiring, by the inertial sensor, motion data of the GNSS enabled device to measure a position of the GNSS enabled device, in the OFF state; and controlling, by the receiver circuitry, the time period based on the specified position accuracy threshold and an operating environment of the GNSS enabled device.

18. The GNSS enabled device according to claim 1, wherein the amount of the power available at the GNSS enabled device indicates an amount of charge available in a battery of the GNSS enabled device.

\* \* \* \* \*